E. H. BRISTOL & W. E. GOODYEAR.
MEASURING OR CONTROLLING INSTRUMENT.
APPLICATION FILED MAY 28, 1908.
1,178,466.
Patented Apr. 4, 1916.
2 SHEETS—SHEET 2.
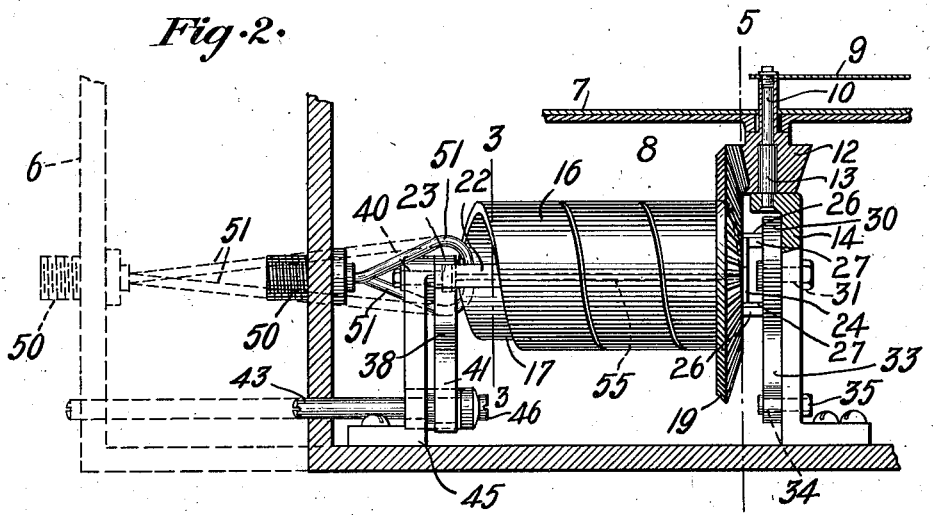
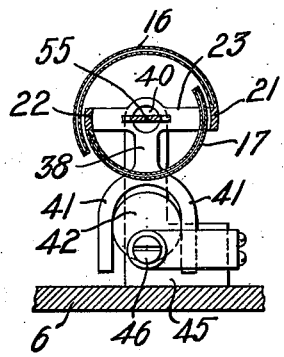
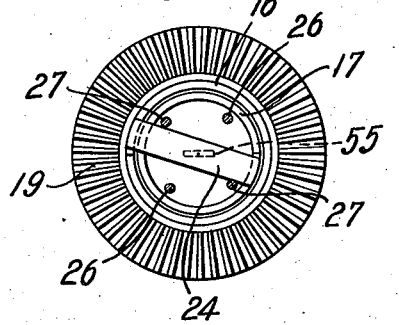
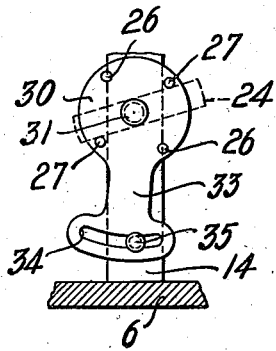
Witnesses:
Walter L. Pierce
Robert H. Kammler
Inventors:
Edgar H. Bristol,
Watson E. Goodyear;
by Emery & Booth,
Attys.

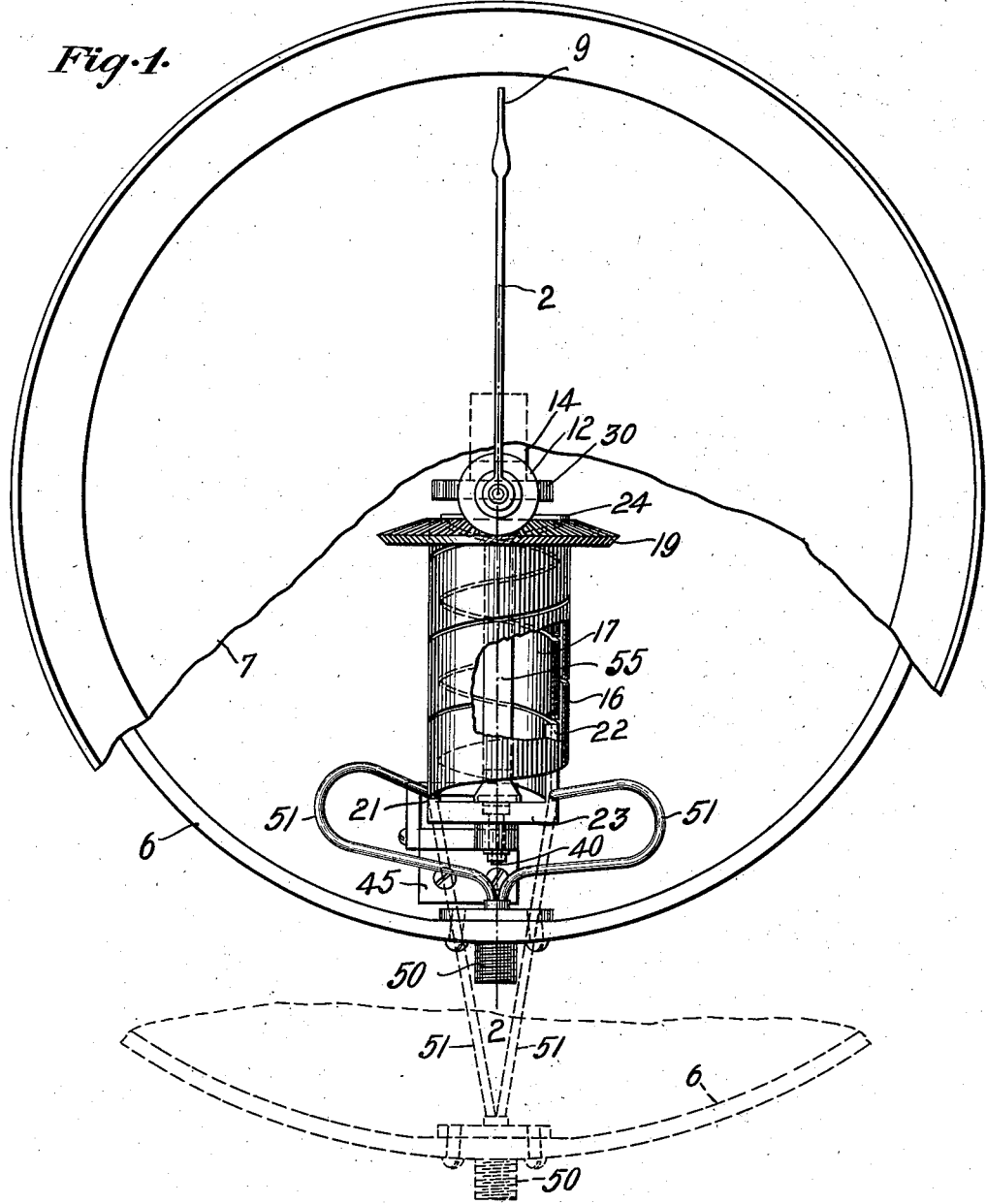

UNITED STATES PATENT OFFICE.

EDGAR H. BRISTOL AND WATSON E. GOODYEAR, OF NAUGATUCK, CONNECTICUT, ASSIGNORS, BY MESNE ASSIGNMENTS, TO THE FOXBORO COMPANY, OF FOXBORO, MASSACHUSETTS, A CORPORATION OF MASSACHUSETTS.

MEASURING OR CONTROLLING INSTRUMENT.

1,178,466.     Specification of Letters Patent.     Patented Apr. 4, 1916.

Application filed May 28, 1908. Serial No. 435,499.

*To all whom it may concern:*

Be it known that we, EDGAR H. BRISTOL and WATSON E. GOODYEAR, both citizens of the United States, and residents of Naugatuck, in the county of New Haven and State of Connecticut, have invented an Improvement in Measuring or Controlling Instruments, (Case H,) of which the following description, in connection with the accompanying drawings, is a specification, like letters on the drawings representing like parts.

This invention pertains to that class of instruments wherein one or more elements responsive to changes in temperature, pressure or the like is or are utilized in performing some desired indicating, governing, actuating or other office, as exemplified in barometers and other pressure gages, thermometers, regulators and the like. As will appear to those skilled in the art the present invention is variously applicable to instruments of this class.

To illustrate one practicable mode of utilizing the features of the invention, the same will be described herein as embodied in a pressure adapted in a preferred form herein described to indicate different pressures by means of a pointer and a suitably graduated dial.

It is to be understood of course that the invention is not limited to the specific construction and organization illustrated in the drawings; nor to the specific operation and use described herein for exemplification.

In the drawings,—Figure 1 is a plan view of the preferred form of instrument, part of the inclosing casing and dial being broken away to disclose its interior; Fig. 2 is a section on the line 2—2 of Fig. 1, partially in elevation; Fig. 3 is a section on the line 3—3 of Fig. 2; Figs. 4 and 5 are both sections on the line 5—5 of Fig. 2, Fig. 4 being viewed from right to left in Fig. 2 and Fig. 5, from left to right.

Referring now to the drawings the mechanism of the instrument may be mounted in a suitable casing 6, which may be of cylindrical shape having at one side a suitably graduated dial 7, preferably removable and mounted upon a dial plate 8 shown in Fig. 2.

The specific instrument about to be described may be used as a pressure gage and for this purpose a pointer or index 9 may be mounted upon a shaft 10, projecting upwardly through the center of the dial 7.

The index 9 may be arranged to rotate about the axis of its shaft 10, in order to indicate pressure conditions, as, for example, steam pressure when the instrument is used as a steam gage.

The preceding detailed description refers to elements already well-known in the art and these may be replaced by any desired equivalents or substituted devices. The index 9 serves merely to exemplify any practicable working device to suit the purpose for which a particular instrument is intended.

The shaft 10 of the specific index or working device may constitute an extension of the hub of a bevel pinion 12, the same being mounted upon a stud shaft 13 supported at the upper end of a bracket 14 projecting upwardly from the base of the casing 6. In the specific construction the bevel pinion 12 is driven by the pressure responsive member of the instrument.

The responsive elements of the instrument to govern the working device 9 are exemplified by a pair of helical tubes 16 and 17. As specifically shown these tubes are wound in the same direction and are adapted to govern the working device 9 conjointly, so that the latter shall act under the cumulative response of the tubes. To this end both tubes may be secured (as by soldering) to a bevel driving gear 19, meshing with the pinion 12. It is convenient when one or more of the described helical tubes is employed, to give the gear 19 the form of an annulus fitting snugly over the tube end, as shown in Fig. 4, and being secured thereto by soldering or otherwise. The ends of the tubes 16 and 17 opposite to the gear 19 may be held normally stationary by being fixed in arms 21, 22 of a bracket 23. With this arrangement an increase in pressure in the tubes tends to unwind the same and thereby tends to produce movement of the free ends of the tubes supporting the gear 19 in a circle about the axis of the helix. Such movement is communicated from the gear 19 to the pinion 12, thereby rotating the index 9 or other working device to an extent dependent upon the amount of pressure in the tube or tubes.

As shown in Fig. 4, the tube 16 is connected to the tube 17 by means of a diametrically disposed strut 24, which may serve to connect the free ends of the tubes rigidly together.

In an instrument of the class described it may be desired that the index 9 or other working device be arranged to indicate or utilize only a part of that response of which the responsive element is capable. For example, in a pressure gage the pressure responsive element may be capable of responding to pressures of from 100 to 1,000 pounds per square inch, while it may be desired to indicate only those pressures between 500 and 800 pounds per square inch. In such case a dial 7 or the like might have graduations extending completely around its circumference and representing pressures from 500 to 800. The transmission between the responsive member and the index being appropriately arranged to coöperate with such graduations, if the responsive device were permitted to respond to the full extent of its capacity, it would perhaps cause the index, after making a number of successive revolutions over the dial, to indicate some pressure which would be entirely different from that actually prevailing. It is expedient, therefore, to limit the effect of the responsive member on the working device, when desired, and this may be done by means of stop devices presently to be described. Such stop devices may serve to prevent a movement of the responsive members sufficient to cause them to set or become permanently warped or distorted. Such stop devices are exemplified by pins 26, 26 and 27, 27 projecting from a plate 30, pivoted on a stud 31 mounted in the bracket 14. The pins 26 and 27 project from their supporting plate 30 into proximity with the strut 24, fixed to the free ends of the responsive tubes, a pin 26 and a pin 27 being positioned on each side of said strut, as shown in Figs. 4 and 5. The pins and the strut are so related that when the latter occupies the position shown in Figs. 4 and 5 and determined by the pins 27, 27 the index 9 or other working device will be held in position to indicate its minimum. Thus, even if the pressure in the tubes fall below such minimum, and therefore tend to rotate the strut 24 further clockwise in Fig. 4 (contraclockwise in Fig. 5), the pins engaging the strut will prevent such further movement. Whenever the pressure in the tubes rises above the minimum the tubes will unwind to some extent, thereby rotating the strut 24 contraclockwise in Fig. 4 (clockwise in Fig. 5) and this may continue until the strut 24 brings up against the pins 26, 26, when the maximum pressure to be indicated is reached. Thereafter, even though pressure in the tubes may increase indefinitely, even to a point at which the tube or tubes would be set or permanently distorted, the tube will not be permitted to respond beyond said maximum but will be restrained by the stop devices.

It will be noted that the two pins 26, 26 coöperate to arrest the tube at a limit of its movement and preferably these two pins engage the strut 24 simultaneously as it reaches said limit and at the same distance from the helical axis about which the strut moves. This arrangement is advantageous in that the tube is acted upon at opposite sides of the axis of its movement, so that the arresting of such movement has no tendency to displace the tube or produce a lateral strain thereon transversely to its axis.

The stop devices, whatever their character, are preferably made adjustable, so that the limits determined thereby may be shifted, if desired, and so that they may be properly disposed in the initial assembling of the mechanism of the instrument. The specific pins 26, 26 and 27, 27 are rendered conveniently adjustable by mounting them upon the plate 30, which is pivoted on the stud 31. The plate has an arm 33 provided with a segmental slot 34, through which passes a clamp bolt 35 mounted in the bracket 14. Upon loosening the screw 35 the plate 30 may be rocked about the stud 31 to any desired position and thereupon the same may be secured in its adjustment by tightening the bolt 35.

It may be desired under various conditions to adjust the responsive members while preserving their relation with the working device 9; and this may be effected by mounting the responsive members 16 and 17 on a bracket 23 integral with or otherwise connected to a base plate 38. In the specific construction shown the base plate 38 is pivoted on a stud bolt 40, preferably coaxial with the helix of the responsive members, so that by swinging the plate 38 on said axis the same may be adjusted angularly thereabout while preserving the desired relation between the tubes and the other parts of the mechanism. The base plate 38 may be bifurcated to supply arms 41, 41 between which plays an eccentric disk 42, fixed on a shaft 43, the latter extending as shown in Fig. 2 to the exterior of the casing 6 to provide ready access thereto. The shaft 43 may have a slot at its end for a screw driver; and may be held in a supporting bracket 45 by a screw 46 having a spring washer which serves to press the eccentric 42 against the bracket and exert friction therebetween to hold the eccentric in adjusted position.

For the purposes of the specific instrument the casing 6 may be provided with a terminal connecting member herein in the form of a socket 50 to receive the terminal pipe of a source of pressure or any other control desired to be utilized in the instrument; and this socket preferably communicates by one or more connecting pipes 51, 51 with the interior of the responsive member or members. Thus when a source of pressure is connected to the socket 50, the pressure will be communicated to the responsive members, which in their resulting action will affect the working device 9, in accordance with the degree of such pressure.

In an instrument of the class described and especially in a pressure responsive instrument, it may be that some factors other than the pressure desired to be utilized may enter into the behavior of the responsive members. For example, the specific helical tubes shown in the drawings, may themselves have a tendency to expand in response to local temperature increases. It is expedient therefore to supply compensating means serving to negative the effect of such influences and thereby eliminate from the operation of the responsive member any influence except that desired to be utilized.

An exemplary compensating device consists of a strip of metal 55, preferably flat and rigidly connected at its ends to the bracket 23 and strut 24, respectively. The strip 55 has preferably a lower coefficient of linear expansion than the material of the responsive member or members; as, for example, the strip 55 made of steel, and the responsive members of brass. With such an arrangement any rotary tendency imparted to the tubes by local temperature changes will be accompanied by a linear expansion of the tubes; and will tend to twist the strip 55. The linear expansion of the tubes being greater in extent than the linear expansion of the strip for the same temperature change, the strip will be placed under linear tension and will therefore offer a greater resistance to twisting and will to the same extent oppose and compensate the rotary tendency on the part of the tube. Likewise whatever the condition of the strip 55 any expansion in the metal of the tube will place the strip under linear tension and increase the resistance which it offers to rotation of the tube, thereby compensating for the continued local temperature effects.

In manufacturing instruments of the class described it is frequently desirable to use the same sizes of responsive elements and mechanisms in instruments having widely different sizes of cases for various purposes, as to accommodate charts, dials and the like of different sizes. At the same time it may be desired that the responsive mechanism of the instrument have the same relation to a given part thereof, as, for example, the center of the dial, in instruments of all sizes. As a result the responsive mechanisms of uniform size may be located at different distances from the exteriors of the casings of different instruments and as heretofore used they have required fittings and conduits of various different sizes to suit such different conditions. The present invention, however, contemplates a responsive mechanism and fittings therefor, which are capable of being used with any size of casing, dial or the like. This may be effected conveniently by making the connecting pipes 51, 51 or their equivalents or substitutes sufficiently flexible to accommodate themselves to whatever distances may intervene between the responsive member and the socket or other part with which connection is desired to be made. For example, in full lines in Fig. 1, an instrument of one size is indicated having the flexible connection 51 in the position shown. In dotted lines is represented an instrument of entirely different size, to which the responsive mechanism is very readily accommodated by simply utilizing the flexibility of the connection 51, as indicated in dotted lines. This feature is of great advantage in manufacturing instruments of the class described, since it permits a uniform product in the form of responsive mechanisms to be utilized in many different connections and for different purposes.

As already stated the invention is by no means limited to the specific construction and uses hereinbefore described or suggested by way of illustration; on the contrary the invention has a wide field of utility and is to be construed as applicable to any use to which it can be practicably applied, as will appear to those skilled in the art.

Structurally the apparatus of the drawings may be variously changed or modified as to suit different purposes. Any practicable number of responsive elements either singly or in coöperation may be used in any desired relation one to another; it is not necessary that all the features of the invention be employed conjointly since they may be used separately to advantage.

Claims—

1. In an instrument of the class described, the combination of a plurality of helical tubes nested together; a bracket for supporting adjacent ends of said tubes; an annular bevel gear encircling the free ends of said tubes and secured thereto; a bevel pinion meshing with said gear; and an index driven through said bevel pinion.

2. In an instrument of the class described, the combination of a responsive member comprising a helical tube; a gear having a plurality of gear teeth, said gear being mounted directly on said tube and encircling the coils of a working device; and provision for governing the working device through said gear teeth.

3. In an instrument of the class described, the combination of a responsive member comprising a helical tube; a gear mounted rigidly upon and encircling the periphery of said tube and constituting in effect a part thereof to move therewith; a working device; and means to govern the working device through said gear.

4. In an instrument of the class described, the combination of a responsive member having a cylindrical surface and having a rotary responsive movement; a gear encircling and concentric with said cylindrical surface of said member and mounted directly thereon and secured thereto to accompany it in such movement; a working device; and means to govern the latter through said gear.

5. In an instrument of the class described, the combination of a casing comprising a bottom and a side wall; a responsive member having supporting means secured to said bottom and positioned on said bottom independently of and without reference to the side wall; an inlet plug in the side wall; and a flexible connection within said casing between the inlet plug and the responsive member, whereby the responsive member may be positioned with relation to said bottom without regard to the distance between the responsive member so positioned and the side wall.

6. In an instrument of the class described, the combination of a casing having a bottom and a side wall, a working device positioned at substantially the center of said bottom and supported by said bottom independently of the side wall; and a controlling system interposed between said side wall and the working device to govern the latter, and including a responsive member having a fixed portion, a terminal connecting member mounted in fixed position with reference to said side wall, and extensible means connecting said fixed portion to said terminal connecting member within said casing and providing for the location of the working device at the center of said bottom regardless of the distance thereof from said side wall.

7. In an instrument of the class described the combination of a helical tube having a plurality of convolutions; a strut connected to the tube and disposed diametrically in relation to the helix; a bracket adjacent to the helix; a plate pivoted to the bracket coaxial with the helix, said plate being adjustable about said axis; and stop pins projecting from said plate into position to be engaged by said strut.

8. In an instrument of the class described, the combination of a working device; a helical responsive member to govern the same; a diametrically disposed strut mounted on said member; and means arranged to act on the strut to restrain movement of the responsive member.

9. In an instrument of the class described, the combination of a working device; a helical responsive member to govern the working device; a diametrically disposed strut mounted on said member; and stop means arranged to act simultaneously on said strut at opposite sides of the axis of the helical member.

10. In an instrument of the class described, the combination of a working device; a helical metallic tube to govern the same; and a compensating strip connected at one end to said tube to be twisted by responsive movement thereof, said strip having a less coefficient of expansion than said tube.

11. In an instrument of the class described, the combination of a working device; a responsive member to govern the same; a compensating device arranged to be tensioned by responsive movement of said member and to oppose such movement by said tension; said compensating device being constructed to vary said opposing tension in consonance with temperature changes, whereby said opposing tension negatives effect of said temperature changes on the responsive member.

12. In an instrument of the class described, the combination of a working device; a responsive member to govern the same, having rotary responsive movement; compensating means arranged to be twisted by such responsive movement; and provision for varying longitudinal tension of the compensating means in consonance with temperature changes, whereby the compensating member offers varying resistance to said twisting.

13. In an instrument of the class described, the combination of a working device; a responsive member to govern the same; a temperature-responsive compensating member; and means for adjusting the responsive and compensating members.

14. In an instrument of the class described, the combination of a working device; a responsive member to govern the same; a temperature-responsive compensating member; and a single means for bodily adjusting the responsive and compensating members.

In testimony whereof, we have signed our names to this specification, in the presence of two subscribing witnesses.

EDGAR H. BRISTOL.
WATSON E. GOODYEAR.

Witnesses:
BENNET B. BRISTOL,
L. B. BAKEL.

It is hereby certified that in Letters Patent No. 1,178,466, granted April 4, 1916, upon the application of Edgar H. Bristol and Watson E. Goodyear, of Naugatuck, Connecticut, for an improvement in "Measuring or Controlling Instruments," an error appears in the printed specification requiring correction as follows: Page 3, lines 125-126, claim 2, strike out the words "said tube and encircling the coils of" and insert the words *and encircling the coils of said tube;* and that the said Letters Patent should be read with this correction therein that the same may conform to the record of the case in the Patent Office.

Signed and sealed this 25th day of September, A. D., 1917.

[SEAL.]

F. W. H. CLAY,

*Acting Commissioner of Patents.*

Cl. 73—109.